United States Patent
Huang et al.

(10) Patent No.: US 6,801,268 B2
(45) Date of Patent: Oct. 5, 2004

(54) STRUCTURE-REINFORCED BEZEL FOR FLAT PANEL DISPLAY

(75) Inventors: Kun-Feng Huang, Tainan (TW); Hsin-Fa Hsu, Tainan (TW)

(73) Assignee: Chi Mei Optoelectronics Corp., Tainan (TW)

( * ) Notice: Subject to any disclaimer, the term of this patent is extended or adjusted under 35 U.S.C. 154(b) by 591 days.

(21) Appl. No.: 09/950,259

(22) Filed: Sep. 10, 2001

(65) Prior Publication Data

US 2002/0105605 A1 Aug. 8, 2002

(30) Foreign Application Priority Data

Dec. 4, 2000 (TW) .......................................... 9020419 A

(51) Int. Cl.⁷ ............................................ G02F 1/1333
(52) U.S. Cl. ...................................... 349/58; 361/683
(58) Field of Search ........................... 349/58; 361/681, 361/683

(56) References Cited

U.S. PATENT DOCUMENTS 6,034,750 A * 3/2000 Rai et al. ...................... 349/57

* cited by examiner

*Primary Examiner*—Robert H. Kim
*Assistant Examiner*—Richard H Kim
(74) *Attorney, Agent, or Firm*—Senniger Powers

(57) ABSTRACT

A structure-reinforced bezel for flat panel display comprises: a bezel body, defined continuously by two opposite first sides and two opposite second sides, each of first sides including a first end wall and a first side wall being substantially perpendicular to and extending from the first end wall, each of second sides including a second end wall and a second side wall substantially perpendicular to and extending from the second end wall, the first side wall and the second side wall extending in a same direction, wherein one of the first side walls is configured to an inward folded shape to define an outer side wall and an inner side wall opposite to the outer side wall, and the inner side wall has at least one hole or one recess.

8 Claims, 6 Drawing Sheets

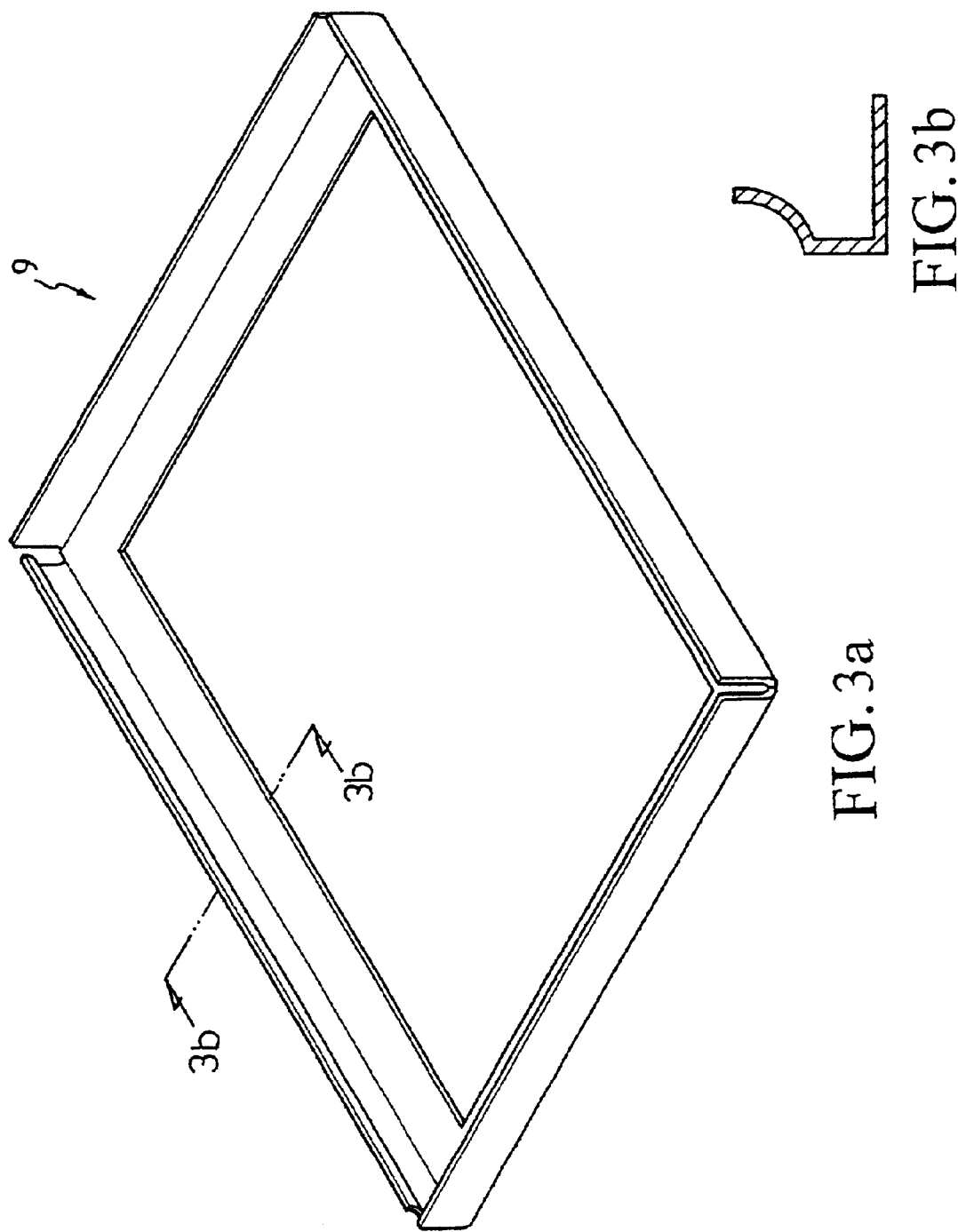

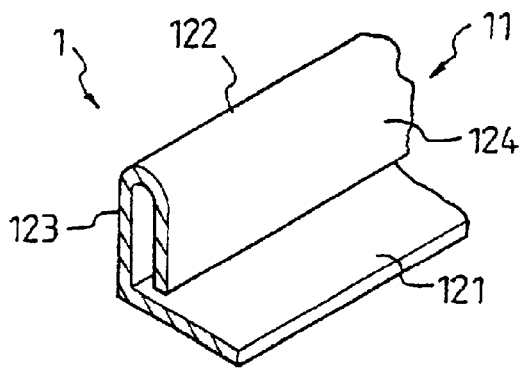
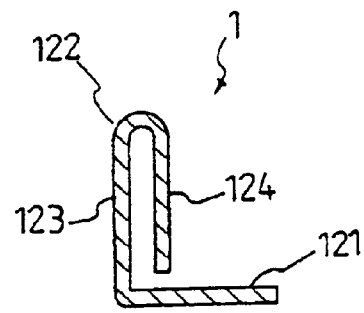
FIG. 5a
FIG. 5b
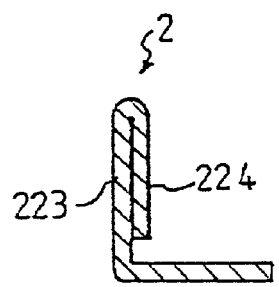
FIG. 6
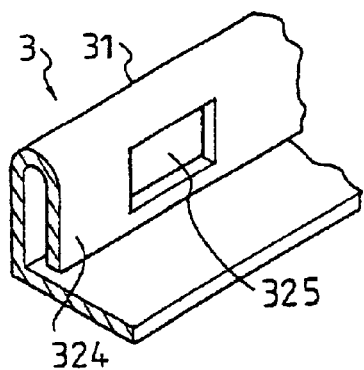
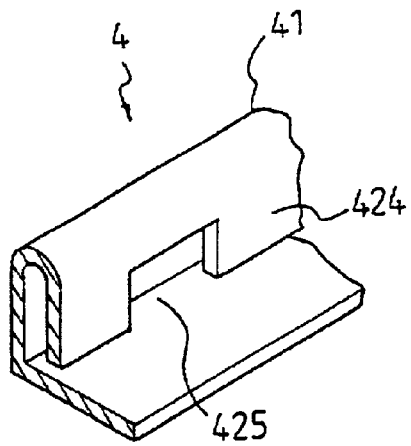
FIG. 7
FIG. 8

STRUCTURE-REINFORCED BEZEL FOR FLAT PANEL DISPLAY

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to a structure-reinforced bezel for flat panel display, particularly to a reinforced bezel which has high structural stiffness and is utilized to encompass a liquid crystal display module of a TFT (Thin Film Transistor) flat panel display.

2. Description of the Related Art

The periphery of a general liquid crystal display module fixed along the sides thereof is encompassed by a metallic bezel to secure the components constituting the liquid crystal display therein. The bezel also acts as an interface between other hardware components of the target products (such as notebook computers, monitors). In designing the cross section of the metallic bezel, the bezel is sometimes formed with some recesses and/or protrusions to reinforce the stiffness in structure.

FIG. 1 is a partially cross sectional view of a general notebook computer. Since the notebook computer usually utilizes a wedge-typed light guide plate L, the components, such as a printed circuit board P, can be placed at the thin side of the light guide plate. Further, the peripheral metallic bezel of a TFT flat panel display has a great influence over the structural stiffness of the module.

Therefore, the structural stiffness is a major factor in determining the overall testing result when the module is undertaken the reliability tests such as bending and vibration tests.

However, in order to meet the lightweight requirement, the metallic bezel is designed to be thinner, which results in the decrease of structural stiffness. Under this tendency, the module may have difficulty in passing the minimum requirement of a reliability test.

According to our experience, in performing the vibration test, the vulnerable point is on the thin side of the light guide plate because the structure strength at this point is weak and this portion contains precision components and joints which are easily to be damaged by vibrations. Therefore, it is a matter of great importance on the strengthening of the structural stiffness, particularly the structural stiffness at this portion.

FIGS. 2a and 2b show a conventional bezel 8 for a flat panel display. As shown, the conventional bezel 8 is a rectangular bezel body. A side wall is perpendicularly extended from each side of the bezel body, respectively.

FIGS. 3a and 3b show another conventional bezel 9 for a flat panel display. As shown, the conventional bezel 9 is a rectangular bezel body. A side wall perpendicularly extends from each side of the bezel body, respectively. One side wall, particularly the one corresponding to the thin side of the light guide plate, is partially curved inward.

However, when the bezel is of small thickness, the above two kinds of bezels cannot sustain the damages in structure resulted from the vibrations. Therefore, a structure-reinforced bezel, which increases the stiffness of the bezel encompassing the periphery of the flat panel display and meets the lightweight requirement, is required to pass the vibration test.

BRIEF SUMMARY OF THE INVENTION

The objective of the present invention is to provide a structure-reinforced bezel for flat panel display wherein by folding at least a side wall of the bezel, the structural stiffness thereof can be remarkably increased to protect the inner components of the flat panel display module.

The other objective of the present invention is to provide a structure-reinforced bezel for flat panel display wherein due to the unique design of the cross section of the bezel, it can pass the vibration test easily and its competition ability in the marketplace can be remarkably increased.

To achieve these objectives, the structure-reinforced bezel for flat panel display in accordance with the claimed invention comprises: a bezel body, defined continuously by two opposite first sides and two opposite second sides, each of the first sides including a first end wall and a first side wall substantially perpendicular to and extending from the first end wall, each of the second sides including a second end wall and a second side wall substantially perpendicular to and extending from the second end wall, the first side wall and the second side wall extending in a same direction, wherein one of the first side walls is configured to an inward folded shape to define an outer side wall and an inner side wall opposite to the outer side wall.

The structure and objectives of the present invention can be more readily understood by persons skilled in the art from the following description of the preferred embodiments taken in conjunction with the accompanying drawings.

BRIEF DESCRIPTION OF THE DRAWINGS

FIG. 2a is a perspective view of the conventional bezel for a flat panel display illustrated in FIG. 1;

FIG. 2b is a cross sectional view taken along Line 2b—2b of FIG. 2a;

FIG. 3a is a perspective view of the other conventional bezel for a flat panel display;

FIG. 3b is a cross sectional view taken along Line 3b—3b of FIG. 3a;

FIG. 5a is a partial perspective view of a structure-reinforced bezel for flat panel display in accordance with the first preferred embodiment of the claimed invention;

FIG. 5b is a cross sectional view of the bezel illustrated in FIG. 5a;

FIG. 6 is a cross sectional view of a structure-reinforced bezel for flat panel display in accordance with the second preferred embodiment of the claimed invention;

FIG. 7 is a partial perspective view of a structure-reinforced bezel for flat panel display in accordance with the third preferred embodiment of the claimed invention;

FIG. 8 is a partial perspective view of a structure-reinforced bezel for flat panel display in accordance with the fourth preferred embodiment of the claimed invention;

DETAILED DESCRIPTION OF THE INVENTION

Figure 4:
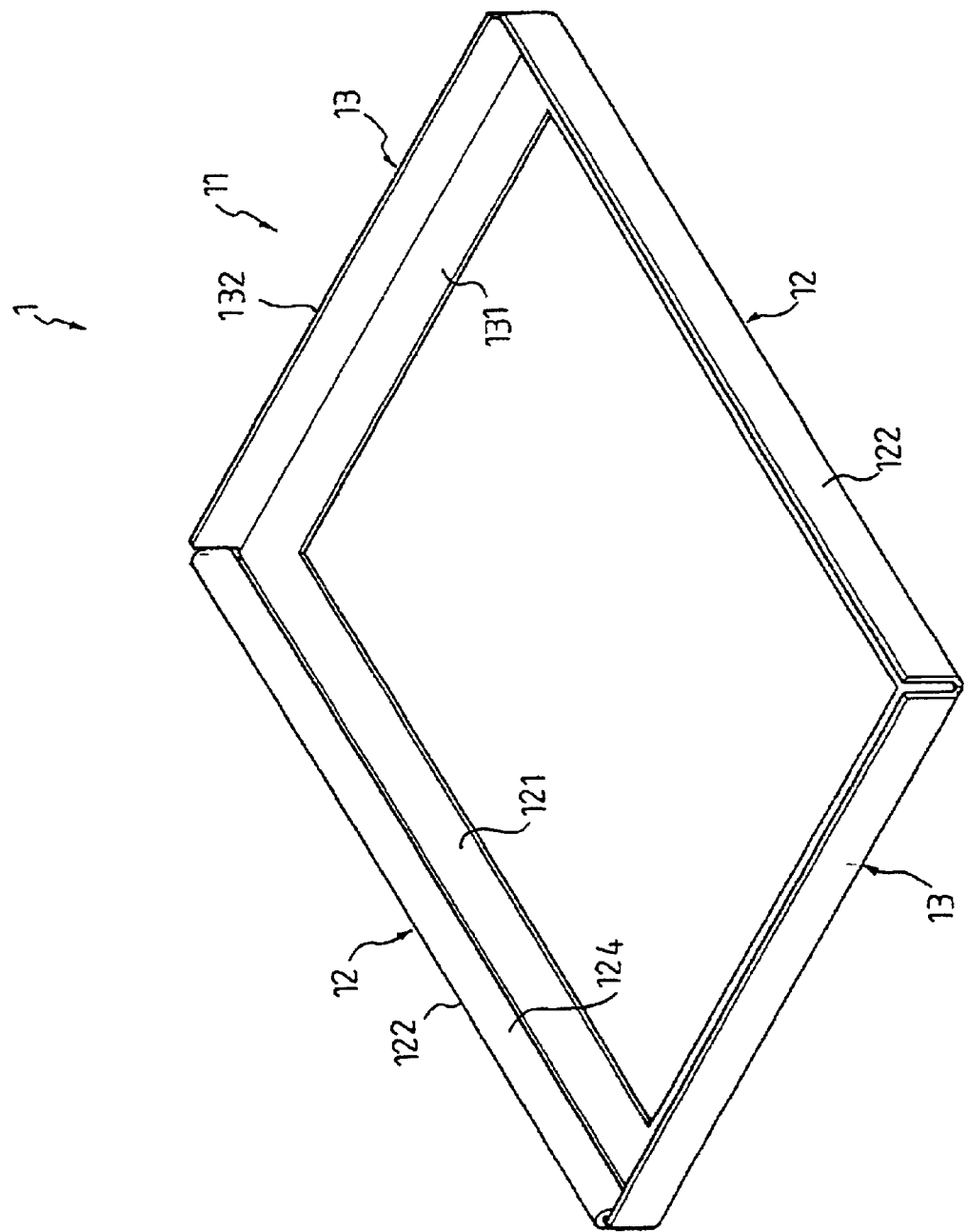
FIG. 4 is a perspective view of a structure-reinforced bezel for flat panel display in accordance with the first preferred embodiment of the claimed invention.

FIG. 4 is a perspective view of a structure-reinforced bezel for flat panel display in accordance with the first preferred embodiment of the claimed invention. As illustrated, the structure-reinforced bezel 1 includes a bezel body 11. The bezel body 11 is defined continuously by two opposite first sides 12, 12 and two opposite second sides 13, 13. The first side 12 is longer than the second side 13 such that the bezel body 11 is substantially rectangular. Each of the first sides 12 includes a first end wall 121 and a first side wall 122 substantially perpendicular to and extending from the first end wall 121. In addition, each of the second sides 13 includes a second end wall 131 and a second side wall 132 substantially perpendicular to and extending from the second end wall 131. Further, the first side walls 122 and the second side walls 132 extend in a same direction.

Moreover, one of the first side walls 122 is configured to an inward folded shape to define an outer side wall 123 and an inner side wall 124 substantially parallel and opposite to the outer side wall 123 (see FIGS. 5a and 5b). In addition, the inner side wall 124 and the outer side wall 123 are spaced apart from each other by a gap.

FIG. 6 illustrates a cross sectional view of a structure-reinforced bezel for flat panel display in accordance with the second preferred embodiment of the claimed invention. As illustrated, in the current embodiment, the structure-reinforced bezel 2 is substantially the same as the structure-reinforced bezel 1 of the first preferred embodiment in structure. However, the inner side wall 224 is in contact with the corresponding opposite outer side wall 223, which results in increasing the space available for receiving the components within the display module with the bezel 2.

In some applications, it is necessary to have holes on the bezel body. FIGS. 7 and 8 illustrate the third and fourth preferred embodiments in accordance with the claimed invention. In the third and fourth preferred embodiments, the structure-reinforced bezels 3 and 4 are substantially the same as the structure-reinforced bezel 1 of the first preferred embodiment in structure, respectively.

As shown in FIG. 7, at least a rectangular hole 325 is formed on the inner side wall 324 of the bezel body 31. In FIG. 8, at least a rectangular recess 425 is formed on the inner side wall 424 of the bezel body 4 and opens at the edge of the inner side wall 424 of the bezel body 41.

Figure 9:
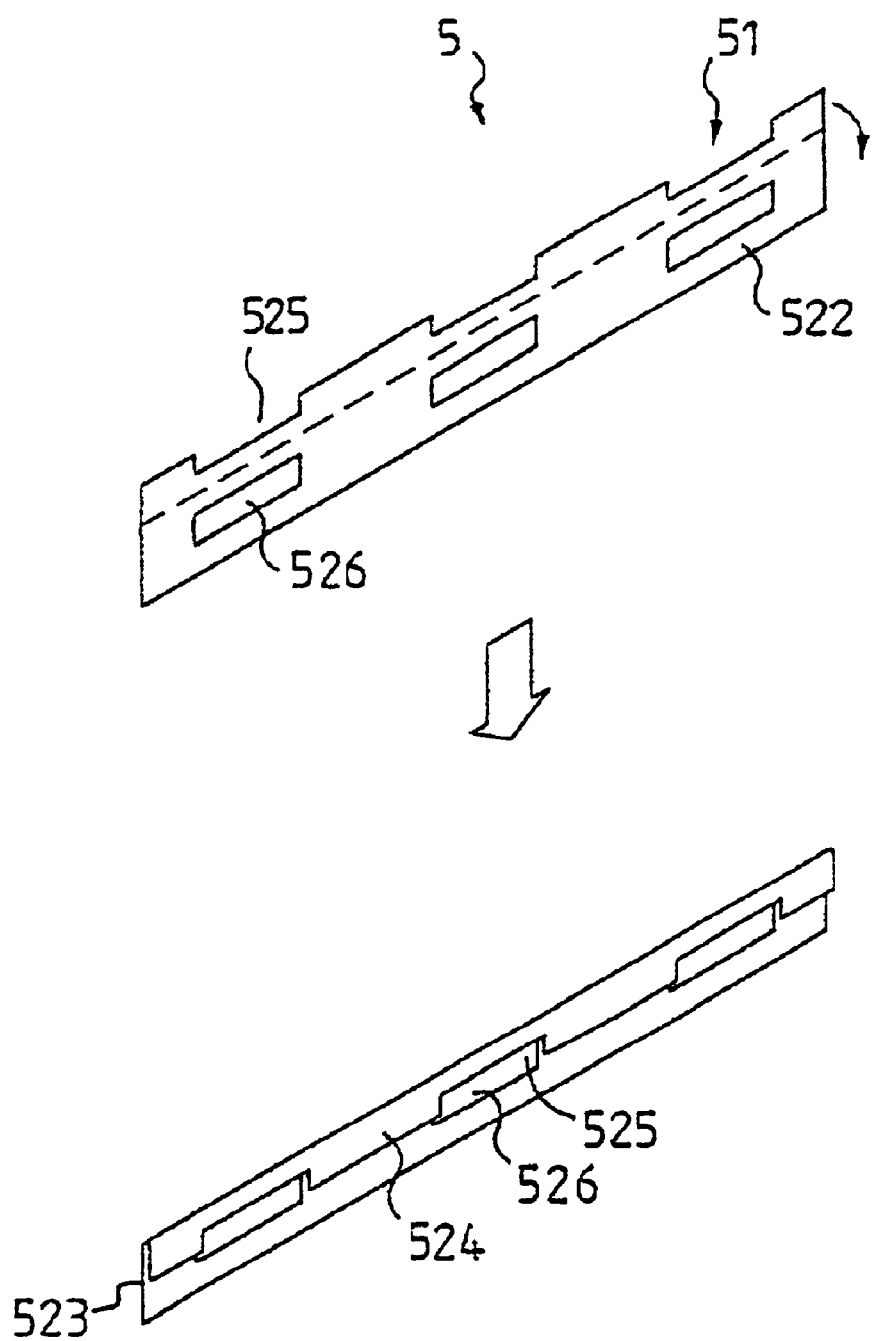
FIG. 9 is a view schematically illustrating the process for forming a structure-reinforced bezel for flat panel display in accordance with the fifth preferred embodiment of the claimed invention.

To further explain the process for forming a structure-reinforced bezel, FIG. 9 schematically illustrates the process for forming a structure-reinforced bezel for flat panel display in accordance with the fifth preferred embodiment of the claimed invention. As illustrated, in the current embodiment, the structure-reinforced bezel 5 is substantially the same as the structure-reinforced bezel 4 of the fourth preferred embodiment in structure. Moreover, the top edge of the first side wall 522 is provided with three rectangular recesses 525 and the lower region of the first side wall 522 has three rectangular holes 526. Each of the rectangular holes 526 longitudinally corresponds to each of the rectangular recesses 525.

As illustrated in FIG. 9, according to the rectangular bezel 51 of the current embodiment, the first side 52 is longer than the second side 53. Further, the top edge and the lower region of the first side wall 522 of the first side 52 are respectively preformed three rectangular recesses 525 and corresponding rectangular holes 526. Therefore, when the first side wall 522 is folded inward to define an outer side wall 523 and an inner side wall 524 opposite to the outer side wall 523, three rectangular holes 526 align with three rectangular recesses 525 such that the components of the display module can pass through the recesses 525 and holes 526 without being blocked by the bezel body 51.

Figure 1:
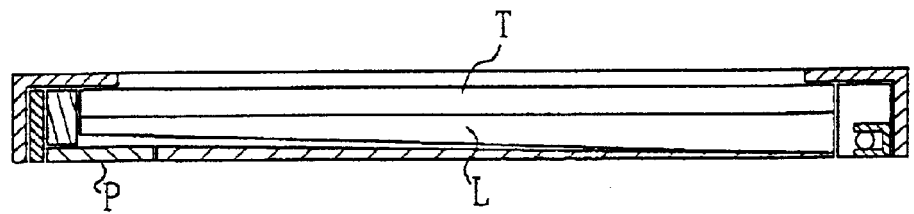
FIG. 1 is a cross sectional view of a flat panel display module with a bezel for a conventional notebook computer.
Figure 10:
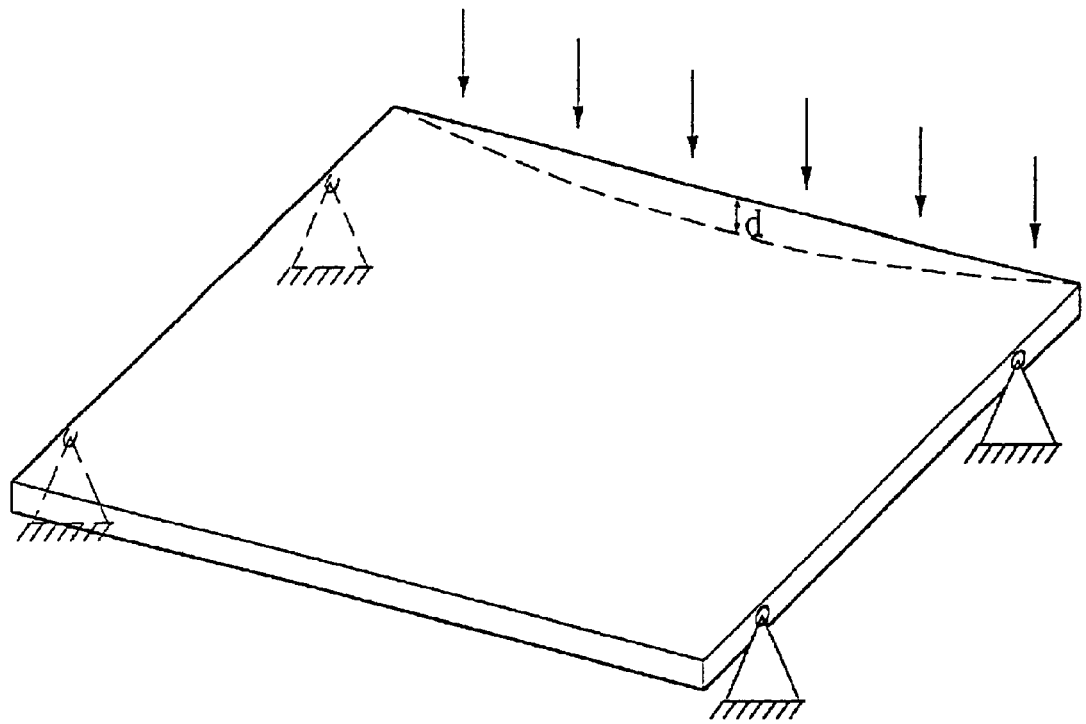
FIG. 10 is a view schematically illustrating the setup for proceeding the numerical analysis for the claimed invention.
Figures 2A, 2B:
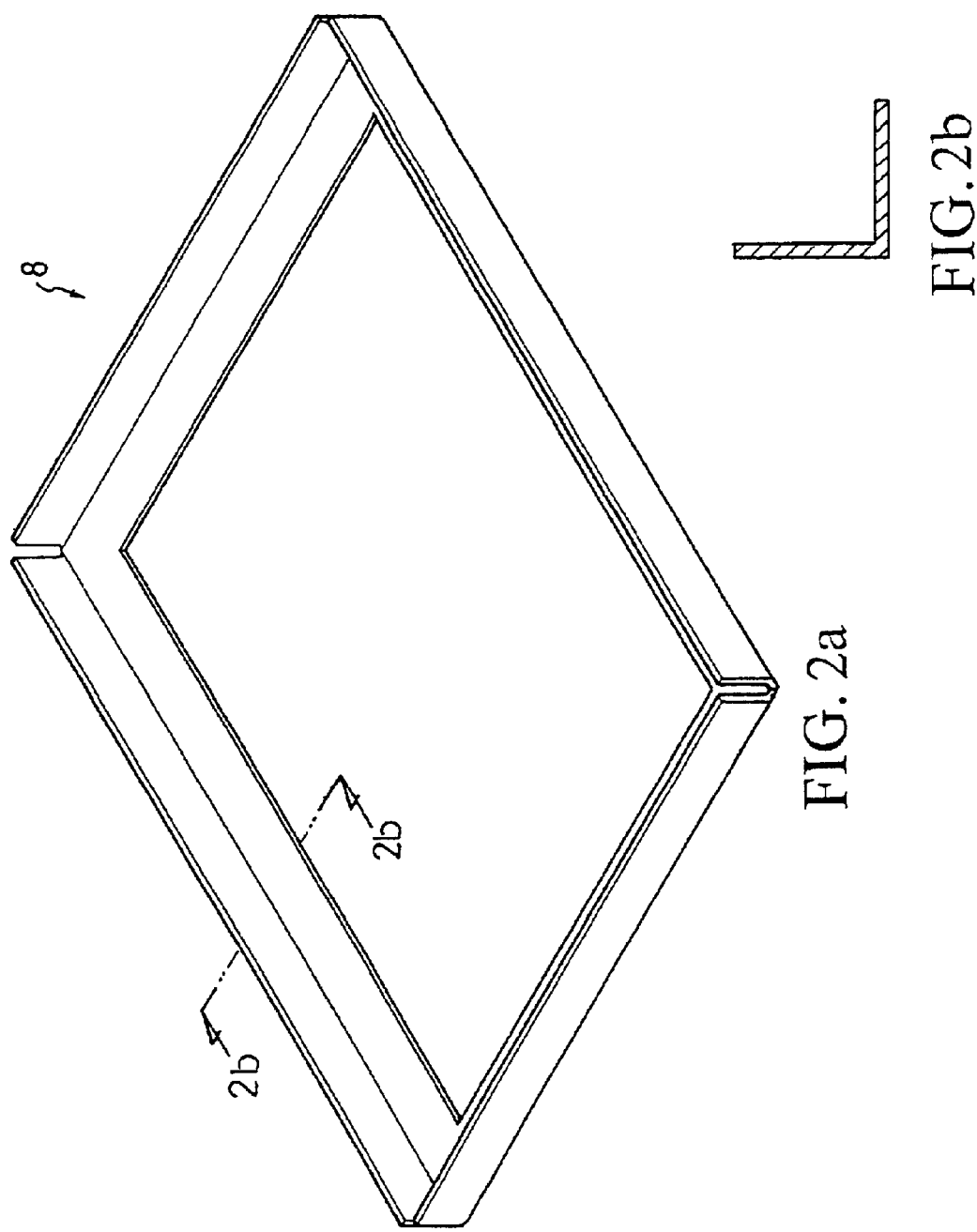

To prove that the claimed invention makes improvements in effects over the prior art, the structure-reinforced bezels in accordance with the first and fourth embodiments of the claimed invention are undertaken a numerical analysis (see FIG. 10). Further, the results therefrom are compared with those obtained from the same numeral analysis with respect to the prior art shown in FIGS. 2a, 2b, 3a and 3b.

As illustrated in FIG. 10, in proceeding the numerical analysis, two points are selected on each of the short second sides of the bezel as fixed boundaries. A force F of 1 N is uniformly applied onto one of the long first sides.

First, the stiffness S is defined as:

$$S = \frac{F}{d}$$

wherein d is the maximum displacement measured from the central point on the long first side of the bezel.

Then the rate of stiffness increase ($\Delta S$) is represented as:

$$\Delta S = \frac{S_2 - S_1}{S_1} = \frac{\frac{F}{d_2} - \frac{F}{d_1}}{\frac{F}{d_1}} = \left(\frac{d_1}{d_2} - 1\right) \times 100\%$$

The results of the numerical analysis are listed in Table 1. According to Table 1, as compared with the prior art, the structure-reinforced bezel has remarkable improvements in effects. Further, it can be observed that the taller the height of the inner side wall is, the larger the stiffness of the bezel will be. In addition, the stiffness of the bezel without recesses is larger than that of the bezel with recesses.

TABLE 1

Results of Numerical Analysis in Stiffness

| | Maximum Disp. (d × 10⁻⁵ mm) | Rate of Stiffness Increase ($\Delta S$) (%, on the basis of the prior art in FIGS. 3a and 3b (thickness of 0.3 mm)) |
|---|---|---|
| Prior art in FIGS. 2a and 2b (thickness of 0.3 mm) | 9.22 | |
| Prior art in FIGS. 3a and 3b (thickness of 0.3 mm) | 9.49 | 0 |
| Prior art in FIGS. 2a and 2b (thickness of 0.4 mm) | 6.12 | 55 |
| First preferred embodiment (thickness of 0.3 mm; height of inner side wall 5 mm) | 5.89 | 61 |
| First preferred embodiment (thickness of 0.3 mm; height of inner side wall 4 mm) | 6.28 | 51 |
| First preferred embodiment (thickness of 0.3 mm; height of inner side wall 3 mm) | 6.58 | 44 |
| Fourth preferred embodiment (thickness of 0.3 mm; height of inner side wall 5 mm) | 6.17 | 54 |

TABLE 1-continued

Results of Numerical Analysis in Stiffness

| | Maximum Disp. (d × $10^{-5}$ mm) | Rate of Stiffness Increase (ΔS) (%, on the basis of the prior art in FIGS. 3a and 3b (thickness of 0.3 mm)) |
|---|---|---|
| Fourth preferred embodiment (thickness of 0.3 mm; height of inner side wall 4 mm) | 6.41 | 48 |
| Fourth preferred embodiment (thickness of 0.3 mm; height of inner side wall 3 mm) | 6.78 | 40 |
| Fourth preferred embodiment (thickness of 0.3 mm; height of inner side wall 2 mm) | 6.81 | 39 |

The structure of the present invention is not limited to the above embodiments. Although the invention has been described with reference to the preferred embodiments, it will be obvious to persons skilled in the art that various changes and modifications may be made without departing from the scope of the invention as recited in the claims.

What is claimed is:

1. A structure-reinforced bezel for flat panel display, comprising:

a bezel body, defined continuously by two opposite first sides and two opposite second sides, each of said first sides including a first end wall and a first side wall being substantially perpendicular to and extending from said first end wall, each of said second sides including a second end wall and a second side wall substantially perpendicular to and extending from said second end wall, said first side wall and said second side wall extending in a same direction, wherein:

one of said first side walls is configured to an inward folded shape to define an outer side wall and an inner side wall opposite to said outer side wall.

2. The structure-reinforced bezel for flat panel display according to claim 1, wherein said first side is longer than said second side, such that said bezel body is substantially rectangular.

3. The structure-reinforced bezel for flat panel display according to claim 2, wherein said first side wall is formed such that said outer side wall is substantially parallel to said opposite inner side wall.

4. The structure-reinforced bezel for flat panel display according to claim 3, wherein said inner side wall is in contact with said opposite outer side wall.

5. The structure-reinforced bezel for flat panel display according to claim 3, wherein said inner side wall and said outer side wall are spaced apart from each other by a gap.

6. The structure-reinforced bezel for flat panel display according to claim 3, wherein said inner side wall has at least one hole.

7. The structure-reinforced bezel for flat panel display according to claim 3, wherein said inner side wall has at least one recess.

8. The structure-reinforced bezel for flat panel display according to claim 7, wherein said outer side wall has at least one hole, corresponding to said at least one recess formed on said inner side wall.

* * * * *